United States Patent [19]

Holt et al.

[11] 4,231,800
[45] Nov. 4, 1980

[54] DRY HEAT SETTING REFRACTORY AND METHODS OF USING SAME

[75] Inventors: John P. Holt, Ladue; Theodore P. Cash, Bonne Terre, both of Mo.

[73] Assignee: Valley Mineral Products Corporation, St. Louis, Mo.

[21] Appl. No.: 38,918

[22] Filed: May 14, 1979

[51] Int. Cl.$^3$ .............................................. C04B 35/04
[52] U.S. Cl. ........................................ 106/58; 106/84
[58] Field of Search ........................... 106/84, 55, 58

[56] References Cited

U.S. PATENT DOCUMENTS

| 2,499,729 | 3/1950 | Daussan | 106/84 |
| 3,075,848 | 1/1963 | Davies et al. | 106/84 |
| 3,193,402 | 7/1965 | Rusoff et al. | 106/84 |
| 3,257,217 | 6/1966 | Van Dreser et al. | 106/84 |
| 3,262,793 | 7/1966 | Neely t al. | 106/84 |
| 3,285,762 | 11/1966 | Wicken | 106/84 |
| 3,470,004 | 9/1969 | Begley et al. | 106/84 |
| 3,813,253 | 5/1974 | Neises | 106/84 |
| 3,830,173 | 8/1974 | Hubble et al. | 106/84 |
| 3,834,914 | 9/1974 | Neely et al. | 106/84 |
| 4,168,177 | 9/1979 | Indelicato et al. | 106/84 |

*Primary Examiner*—James Poer
*Attorney, Agent, or Firm*—Gravely, Lieder & Woodruff

[57] ABSTRACT

This disclosure involves a dry heat setting refractory and method of using same in the securing of nozzles to nozzle blocks in steel pour ladles. The refractory is sized so that it can be placed between the nozzle and nozzle block in a dry condition, and then forms an adhesive bond in situ, when molten steel is poured into the ladle and onto the refractory. The composition comprises a sized refractory material, preferably having MgO in the fines fraction, and includes the addition of about 2 to about 6% hydrated alkali silicate, preferably sodium silicate, which forms a refractory bond when engaged by the hot metal.

8 Claims, No Drawings

DRY HEAT SETTING REFRACTORY AND METHODS OF USING SAME

BACKGROUND OF THE INVENTION

Since the invention of the "bottom-pour" ladle, more than one hundred years ago, nozzles have been "set" in nozzle blocks by smearing wet fireclay on the nozzle and pushing the nozzle into place in the nozzle block. Then the ladle is heated with a gas or oil flame until the fireclay is dried and has set. This heating consumes many hours. It is imperative that the fireclay be completely dry, as any moisture trapped under molten steel or other hot molten metal will instantly flash into high pressure steam which can explode dangerously, throwing hot molten metal in all directions.

Although fireclay has and is being used extensively for setting nozzles, its use has other disadvantages. The thermal bond or "set" that it forms is weak and occasionally breaks during teeming. The nozzle then floats to the top surface of the molten metal which rushes out through the nozzles block in a disastrously uncontrollable stream which cannot be poured into a mold or tundish and so must be discarded as scrap. In addition, such uncontrolled pouring is extremely hazardous to personnel working in the plant.

Wet "air-setting" refractories are used to a limited degree to set a nozzle in a nozzle block. These are smeared on the nozzle before inserting it into the nozzle block and also must be carefully fired to remove the last traces of moisture before using the nozzle in a pour. These refractories contain chemical bonds, typically liquid sodium silicate, which when dried forms a strong bond. Consequently the nozzle is strongly cemented to the nozzle block from top to bottom. Punching the nozzle out after using it results in severe damage to the nozzle block which must be replaced after one or only a few pours. As nozzle blocks are large and heavy, they are expensive and time-consuming to remove and replace, air-setting mortars are not generally used for nozzle-setting.

Accordingly, one of the principal objects of the present invention is to provide rapid heat-setting refractories which can be used to hold in place nozzles employed for pouring steel or other molten metals. These refractories are granular and dry. They may be poured into the annular space between nozzles and their nozzle blocks which are normally located in the bottom of the ladles, tundishes or other vessels used for holding and pouring hot molten metal. It is then not necessary to heat the refractory to high temperatures before use as the heat from molten metal tapped into even a cold ladle hardens the refractory, so that the refractory, nozzle and nozzle block are almost instantly cemented together. The rapidity of this cementing action prevents the nozzle, usually made of fireclay or other ceramic material which has considerably lower specific gravity than molten metals, such as steel, from floating out of the nozzle block when the stopper-rod is raised for "teeming" or pouring the steel through the nozzle.

An additional advantage of using these dry, heat-setting refractories is that only the top few inches of the nozzle are cemented to the nozzle block. Thus after the heat or batch of molten metal has been poured the used nozzle can be easily punched out with minimum damage to the nozzle block. Nozzles are generally used only once. Nozzle blocks, if not damaged when the used nozzles are punched out, can last through the full life of the ladle lining which, in typical steel plant use may be fifteen to thirty pours or more.

Thus it is another principal object of this invention to provide a reliable dry heat setting refractory which allows a nozzle to be removed from a nozzle block after use without damaging the nozzle block.

It is still another major object of this invention to provide a quick and inexpensive method of setting nozzles. This method requires less skill to be used successfully and it saves considerable time and energy because it does not require any preheating prior to use in pouring hot molten metals, such as steel or other substances.

Our method does not require the hours of preheating presently necessary to dry fireclay and other refractories currently in use. Our method also provides a stronger bond than does fireclay so that accidents resulting from inadvertent breaking of the bond between the nozzle and nozzle block are obviated.

These and other objects and advantages will become apparent hereinafter.

DETAILED DESCRIPTION

Those refractories suitable for use in the present invention can be made from a large variety of refractory grains including, but not limited to magnesite, dense alumina, mullite and other prepared alumino-silicates and natural refractory igneous rocks. Such a material is crushed so that all passes a 0.25" sieve, and preferably a 0.15" sieve. The resulting crushed grains are separated into two or more size fractions and the smallest size fraction should comprise five to sixty percent of the whole and it should be ground in a ball mill or other suitable comminuting device so that most of it passes a U.S. 200 mesh screen. These fractions are then carefully re-blended, the purpose being to provide a grain size distribution which will smoothly and rapidly flow into the annular space between nozzle and nozzle block which is typically only about 0.25" wide and by the action of gravity alone to form the most dense, least porous filling possible. Space limitations make tamping virtually impossible and the size and weight of most ladles make them virtually impossible to vibrate to effect consolidation of the grains.

Additives well known in the art to produce free-flowing, such as fractional-percentage amounts of glacial acetic acid, or various amounts of substances for other purposes, depending upon the characteristics of the particular grains employed, may be required. An example of such a product made from natural magnesite containing 87% MgO (periclase) is as follows:

| | | |
|---|---|---|
| Coarse Fraction: | Magnesite (87% MgO), sized −0.147" + U.S. 12 Mesh | 33.0% |
| Intermediate Fraction: | Magnesite (87% MgO), sized −U.S. 12 Mesh + U.S. 70 Mesh | 43.0% |
| Fine Fraction: | Magnesite (87% MgO), sized 80% −U.S. 200 Mesh | 20.0% |
| | Hydrated Sodium Silicate | 4.0% |
| | Total | 100% |

These fractions are blended carefully in an intensive mixer and packaged in multiwalled paper bags containing about sixty pounds each. This product is suitable for steel plant use.

The refractory grain, as mentioned, includes magnesite, dense alumina, mullite and other alumino-silicates stable at high temperatures, olivine, whole grain, hardburned, dead burned, dolomite, exotic and expensive unreactive grain, such as zirconia or spinel. The preferred materials for the coarse grain fraction are magnesite, olivine and mixtures thereof. There are certain practical problems with dead-burned dolomite, such as its inherent instability in moisture laden air. Crushing greatly aggravates this instability so that obtaining optimum grain size distribution is a problem. The important consideration is that the refractory not react at or below steelmaking temperatures to form large amounts of liquid or molten slags which could cause dangerous refractory failure which would allow the nozzle to break loose and float out, resulting in uncontrolled pouring. Moreover, when the refractory is to be used in a steel furnace or in any ferrous metal application, fireclay should be excluded from the composition. Even minor amounts of fireclay, up to 3%, cause undesirable effects when used in a steelmaking process because fireclay tends to lower the refractoriness of the composition.

If there are too many fines in the composition, dust may be a problem in use. The present composition, containing about 15 to about 25% fines of which about 80% are −200 Mesh, is satisfactory from a dust standpoint. The in-place refractory must be sufficiently low in porosity to resist penetration by the molten metal which will erode the refractory from between the nozzle and the nozzle block, so an appreciable amount of fines is a necessity.

These fines are preferably made from dead-burned magnesite. The purpose of the dead burned magnesite in the fines fraction is to prevent the refractory from breaking up or "coming apart" at the 1500° F. melting point of sodium silicate. This would cause the nozzle block to float up in the molten steel which is at 2800°-3000° F. with the disastrous results previously discussed. The magnesite reacts with the sodium silicate as hereinafter set forth. The fine magnesite is necessary because the intermediate or coarse fractions react too slowly with the alkali silicate to be effective. It is important to avoid reactions which generate large amounts of liquid at or below steelmaking temperatures. Therefore with the exception of spinel (magnesium aluminate), any refractory grains which contain as their essential ingredients alumina, silica, or combinations of compounds of these two are not suitable for use in the fine fraction. If the fine fraction contains spinel there must be sufficient fine magnesite present to react with the alkali silicate and absorb the $Na_2O$ formed. As mentioned, the alkali silicate (sodium silicate preferably) reacts with the magnesite fines to obtain additional bonding action in the final product through the reaction:

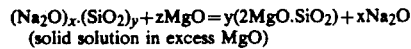
(solid solution in excess MgO)

$2MgO \cdot SiO_2$ or $Mg_2SiO_4$ is the highly refractory mineral, forsterite, (melting point 3434° F.) so it is a harmless reaction product in this application. The small amount of $Na_2O$ which goes into solid solution in the excess MgO (magnesite) has no significant effect on the refractoriness of the magnesite.

In addition to 87% MgO in the coarse, intermediate, and fine fractions, we can use 95% MgO grains or a mixture of 95% MgO and olivine (an igneous rock) in the coarse and intermediate fractions and 95% MgO in the fine fraction. Compositions made from the latter formula have proven satisfactory in steelmaking operations.

The use of hydrated alkali silicates in the formulation allows the material to be placed in the ladle dry and a bond is formed in situ when the hot steel engages the dry refractory. The hydrated silicates contain approximately 19% water of hydration.

Other possible silicates are lithium and potassium. Other alkali silicates, such as rubidium, cesium and francium (which is radioactive, having a half life of about eleven days) are so rare and expensive as to be impractical in this type product. In fact, only sodium and potassium hydrated silicates are commercially available at present.

The action of the hydrated silicates when heated rapidly is to dissolve in their own water of hydration, and thus be dispersed through the refractory mass whereupon additional heat dries the silicate again, this time forming a strong bond between refractory grains. There is not sufficient steam developed to result in pressures large enough to bring about any danger of explosion and the very small amount of steam formed is driven down, away from the steel.

The preferred hydrated alkali silicate is hydrated sodium silicate. A hydrated sodium silicate having a silica to soda ratio of 2:00 to 1 is preferred. Such a product is made by Philadelphia Quartz Co. However the hydrated sodium silicates are glasses and the silica to soda ratio of 2.50 and 3.22 to 1.00 also are satisfactory. Products of a type having more silica tend to be less costly than products having less silica. The hydrated potassium silicates also are satisfactory.

The sizing of the grain is fairly critical and following is a range of grain sizes.

|  |  | Preferred | Range |
|---|---|---|---|
| Coarse Fraction: | −0.147" + U.S. 12 Mesh | 33.0% | 28-38% |
| Intermediate Fraction: | −U.S. 12 Mesh + U.S. 70 Mesh | 43.0% | 38-48% |
| Fine Fraction: | 80% −U.S. 200 Mesh | 20.0% | 15-25% |
|  | TOTAL | 96.0% |  |

The remaining part of the composition is hydrated sodium silicates. The gross chemical analysis of one such satisfactory silicate is:

| $Na_2O$ | 27.0% |
|---|---|
| $SiO_2$ | 54.0% |
| $H_2O$ | 19.0% |

The water content is by difference and it probably contains minor amounts of a variety of substances.

The preferred amount of hydrated alkali silicate is about 4%, although a range of about 2% to about 6% is satisfactory. More than about 6% adversely affects the refractoriness of magnesite refractories and generally should be avoided. Less than about 2% results in uncertain fusing of the refractory mass.

In the past the art has tried to make use of the self-solubility of rapidly-heated hydrated alkali silicates in gunning refractories without success although Bulletin 24-1 (1969) of Philadelphia Quartz Co. states that "On sudden exposure to heat, "G" and "GD" silicates will fuse in their water of hydration near 400°

F. The temporary tackiness developed is helpful in the adhesion of gunning compounds."

The art has not been able to use this concept successfully in gunning refractories, and in fact, the only way to make gunning refractories adhere is to add water soluble polymers, or like sticky substances, to the composition and to add water to the composition to activate the additive prior to shooting the mass onto a wall.

Hydrated alkali silicates have been used for many years to make granular refractories which are mixed with water at the application site and tamped, gunned or shoveled in place in a wet state.

However the use of hydrated alkali silicates in a dry mix, which, when put in place dry and engaged by hot molten metal, form a solid in place refractory mass, is not a process which is known to the metal casting art.

What is claimed is:

1. A dry heat setting refractory composition which forms an adhesive bond in situ upon application of sufficient heat to melt said alkali silicate, comprising about 94% to about 98% refractory material and about 6% to about 2% of hydrated alkali silicate, said refractory material being sized so that it contains about 28% to about 38% coarse fraction, about 38% to about 48% intermediate fraction and about 15% to about 25% fine fraction, said fine fraction containing sufficient magnesite to react with the alkali silicate present to form fosterite and a solid solution of alkali oxide in excess MgO to provide a bond preventing the refractory from breaking up at temperatures above the melting point of said alkali silicate, said composition being substantially free of water and materials which generate substantial amounts of liquid at or below steelmaking temperatures.

2. The refractory of claim 1 wherein the hydrated alkali silicate is hydrated sodium silicate.

3. The refractory of claim 1 wherein the refractory material all passes a 0.25" sieve and from about 5% to about 60% passes a U.S. 200 Mesh screen.

4. The refractory of claim 1 wherein the refractory material all passes a 0.15" sieve and from about 5% to about 60% passes a U.S. 200 Mesh screen.

5. The refractory of claim 1 wherein the refractory material is magnesite or magnesite and olivine in the coarse and/or intermediate fraction.

6. The dry heat setting refractory of claim 1 wherein the refractory material has about 28% to about 38% $-0.147''$ $+$U.S. 12 mesh, about 38% to about 48% is $-$U.S. 12 mesh $+$U.S. 70 mesh, and about 15% to about 25% is 80% $-$U.S. 200 mesh.

7. The refractory of claim 6 wherein the hydrated alkali silicate is hydrated sodium silicate.

8. The refractory of claim 7 wherein the refractory material is magnesite.

* * * * *